United States Patent
Nangare et al.

(10) Patent No.: US 12,249,349 B1
(45) Date of Patent: Mar. 11, 2025

(54) ROTATION FILTER FOR DIGITAL TIMING RECOVERY IN HARD DISK DRIVE READ CHANNEL

(71) Applicant: Marvell Asia Pte Ltd, Singapore (SG)

(72) Inventors: Nitin Nangare, Sunnyvale, CA (US); William J. Mitchem, Broomfield, CO (US)

(73) Assignee: Marvell Asia Pte Ltd, Singapore (SG)

(*) Notice: Subject to any disclaimer, the term of this patent is extended or adjusted under 35 U.S.C. 154(b) by 0 days.

(21) Appl. No.: 18/594,142

(22) Filed: Mar. 4, 2024

Related U.S. Application Data

(60) Provisional application No. 63/450,656, filed on Mar. 7, 2023.

(51) Int. Cl.
    *G11B 20/10*  (2006.01)

(52) U.S. Cl.
    CPC .. *G11B 20/10055* (2013.01); *G11B 20/10037* (2013.01); *G11B 20/10259* (2013.01)

(58) Field of Classification Search
    None
    See application file for complete search history.

(56) References Cited

U.S. PATENT DOCUMENTS

| | | | | |
|---|---|---|---|---|
| 5,504,751 A * | 4/1996 | Ledzius | ........... | G11B 20/10037 375/360 |
| 5,719,574 A * | 2/1998 | Nishio | ............. | G11B 20/10009 |
| 5,812,333 A * | 9/1998 | Colineau | ............. | G11B 21/103 360/77.12 |
| 5,835,295 A * | 11/1998 | Behrens | ........... | G11B 20/10009 360/51 |
| 5,999,355 A * | 12/1999 | Behrens | ........... | G11B 20/10009 375/232 |
| 2007/0041116 A1* | 2/2007 | Kajiwara | ......... | G11B 20/10481 |
| 2009/0019102 A1* | 1/2009 | Skaug | ............. | G11B 20/10009 708/323 |

\* cited by examiner

*Primary Examiner* — Peter Vincent Agustin

(57) ABSTRACT

A method for digital timing recovery from oversampled analog signals includes computing filter coefficients for digitized samples of the oversampled analog signals based on an oversampling factor of the oversampled analog signals, using the filter coefficients in a rotation filter to compensate for the oversampling factor in the digitized samples of the oversampled analog signals, deriving a starting phase and magnitude from the compensated digitized samples of the oversampled analog signals, and using the starting phase and magnitude in a timing recovery loop to recover a clock from the compensated digitized samples of the oversampled analog signals. The rotation filter may include a plurality of taps, and the circuitry may be configured to compute respective sets of coefficients for respective taps. Each set of coefficients may be dependent on another set of coefficients, or the coefficients may be approximate with each set of approximate coefficients being independent.

25 Claims, 12 Drawing Sheets

ROTATION FILTER FOR DIGITAL TIMING RECOVERY IN HARD DISK DRIVE READ CHANNEL

CROSS REFERENCE TO RELATED APPLICATIONS

This disclosure claims the benefit of commonly-assigned United States Provisional Patent Application No. 63/450,656, filed Mar. 7, 2023, which is hereby incorporated by reference herein in its entirety.

FIELD OF USE

This disclosure relates to digital timing recovery for use in the read channel of a hard disk drive. More particularly, this disclosure relates to a rotation filter to compensate, in digital timing recovery, for oversampling of analog signals.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

When reading the data, a clock has to be recovered from the data that is read. In typical analog timing recovery techniques, information is fed back from the digital domain to an analog clock source—e.g., a phase-locked loop (PLL)—that clocks the analog-to-digital converter (ADC). The feedback loop typically introduces substantial latency based on, e.g., the latency of various components of the feedback loop. If the disk drive uses two heads, as in two-dimensional magnetic recording (TDMR) implementations, additional latency is introduced by any buffering needed to account for the distance between read heads.

SUMMARY

In accordance with implementations of the subject matter of this disclosure, a method for digital timing recovery from oversampled analog signals includes computing filter coefficients for digitized samples of the oversampled analog signals based on an oversampling factor of the oversampled analog signals, using the filter coefficients in a rotation filter to compensate for the oversampling factor in the digitized samples of the oversampled analog signals, deriving a starting phase and magnitude from the compensated digitized samples of the oversampled analog signals, and using the starting phase and magnitude in a timing recovery loop to recover a clock from the compensated digitized samples of the oversampled analog signals.

In a first implementation of such a method, the computing may include computing respective sets of approximate coefficients for respective taps of the rotation filter, each set of approximate coefficients being independent of another set of approximate coefficients, and the method may further include applying a bias to the clock recovered from the compensated digitized samples of the oversampled analog signals, to account for the approximate coefficients.

In a second implementation of such a method, the computing may include computing respective sets of coefficients for respective taps of the rotation filter, each set of coefficients being dependent on another set of coefficients.

In a third implementation of such a method, when the oversampled analog signals are from zones of a storage medium, the computing may include computing respective separate sets of the filter coefficients corresponding to each respective zone.

A first aspect of that third implementation may further include storing the respective sets of the filter coefficients, and retrieving the respective sets of the filter coefficients according to the respective zone.

In a fourth implementation of such a method, the computing may include performing a plurality of partial calculations, and combining selected ones of the plurality of partial calculations in sequence.

According to a first aspect of that fourth implementation, the combining may include multiplexing outputs of some of the selected ones of the plurality of partial calculations to provide inputs to others of the selected ones of the plurality of partial calculations.

In accordance with implementations of the subject matter of this disclosure, digital timing recovery circuitry, configured to recover a clock from oversampled analog signals, includes circuitry configured to compute filter coefficients for digitized samples of the oversampled analog signals based on an oversampling factor of the oversampled analog signals, a rotation filter configured to use the filter coefficients to compensate for the oversampling factor in the digitized samples of the oversampled analog signals, zero phase start circuitry configured to derive a starting phase and magnitude from the compensated digitized samples of the oversampled analog signals, and a timing recovery loop configured to recover the clock from the compensated digitized samples of the oversampled analog signals.

In a first implementation of such digital timing recovery circuitry, the rotation filter may include a plurality of taps, and the circuitry configured to compute the filter coefficients may be configured to compute a respective set of approximate coefficients for each respective tap of the rotation filter, each set of approximate coefficients being independent of another set of approximate coefficients.

According to a first aspect of that first implementation, the rotation filter may include two taps.

A second aspect of that first implementation may further include bias circuitry configured to apply a bias to the clock recovered from the compensated digitized samples of the oversampled analog signals, to account for the approximate coefficients.

In a second implementation of such digital timing recovery circuitry, the rotation filter may include a plurality of taps, and the circuitry configured to compute the filter coefficients may be configured to compute respective sets of coefficients for respective taps of the rotation filter, each set of coefficients being dependent on another set of coefficients.

In a third implementation of such digital timing recovery circuitry, when the oversampled analog signals are from zones of a storage medium, the circuitry configured to compute the filter coefficients may be configured to compute respective separate sets of the filter coefficients corresponding to each respective zone.

A first aspect of that third implementation may further include memory configured to store the respective sets of the filter coefficients, and a processor configured to retrieve the respective sets of the filter coefficients according to the respective zone.

In a fourth implementation of such digital timing recovery circuitry, the circuitry configured to compute the filter coefficients may include a plurality of computation circuits, each respective computation circuit in the plurality of computation circuits being configured to perform a respective partial calculation, and circuitry for combining selected ones of the respective partial calculations in sequence.

According to a first aspect of that fourth implementation, the circuitry for combining may include a multiplexer configured to select outputs of some of the selected ones of the plurality of computation circuits as inputs to others of the selected ones of the plurality of computation circuits.

In accordance with implementations of the subject matter of this disclosure, digital timing recovery circuitry, configured to recover a clock from oversampled analog signals, includes means configured to compute filter coefficients for digitized samples of the oversampled analog signals based on an oversampling factor of the oversampled analog signals, rotation filter means configured to use the filter coefficients to compensate for the oversampling factor in the digitized samples of the oversampled analog signals, zero phase start means configured to derive a starting phase and magnitude from the compensated digitized samples of the oversampled analog signals, and timing recovery means configured to recover the clock from the compensated digitized samples of the oversampled analog signals.

In a first implementation of such digital timing recovery circuitry, the rotation filter means may include a plurality of taps, and the means configured to compute the filter coefficients may be configured to compute a respective set of approximate coefficients for each respective tap of the rotation filter means, each set of approximate coefficients being independent of another set of approximate coefficients.

According to a first aspect of that first implementation, the rotation filter means may include two taps.

A second aspect of that first implementation may further include biasing means configured to apply a bias to the clock recovered from the compensated digitized samples of the oversampled analog signals, to account for the approximate coefficients.

In a second implementation of such digital timing recovery circuitry, the rotation filter means may include a plurality of taps, and the means configured to compute the filter coefficients may be configured to compute respective sets of coefficients for respective taps of the rotation filter means, each set of coefficients being dependent on another set of coefficients.

In a third implementation of such digital timing recovery circuitry, when the oversampled analog signals are from zones of a storage means, the means configured to compute the filter coefficients may be configured to compute respective separate sets of the filter coefficients corresponding to each respective zone.

A first aspect of that third implementation may further include memory means configured to store the respective sets of the filter coefficients, and processor means configured to retrieve the respective sets of the filter coefficients according to the respective zone.

In a fourth implementation of such digital timing recovery circuitry, the means configured to compute the filter coefficients may include a plurality of computation means, each respective computation means in the plurality of computation means being configured to perform a respective partial calculation, and means for combining selected ones of the respective partial calculations in sequence.

According to a first aspect of that fourth implementation, the means for combining may include multiplexing means configured to select outputs of some of the selected ones of the plurality of computation means as inputs to others of the selected ones of the plurality of computation means.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
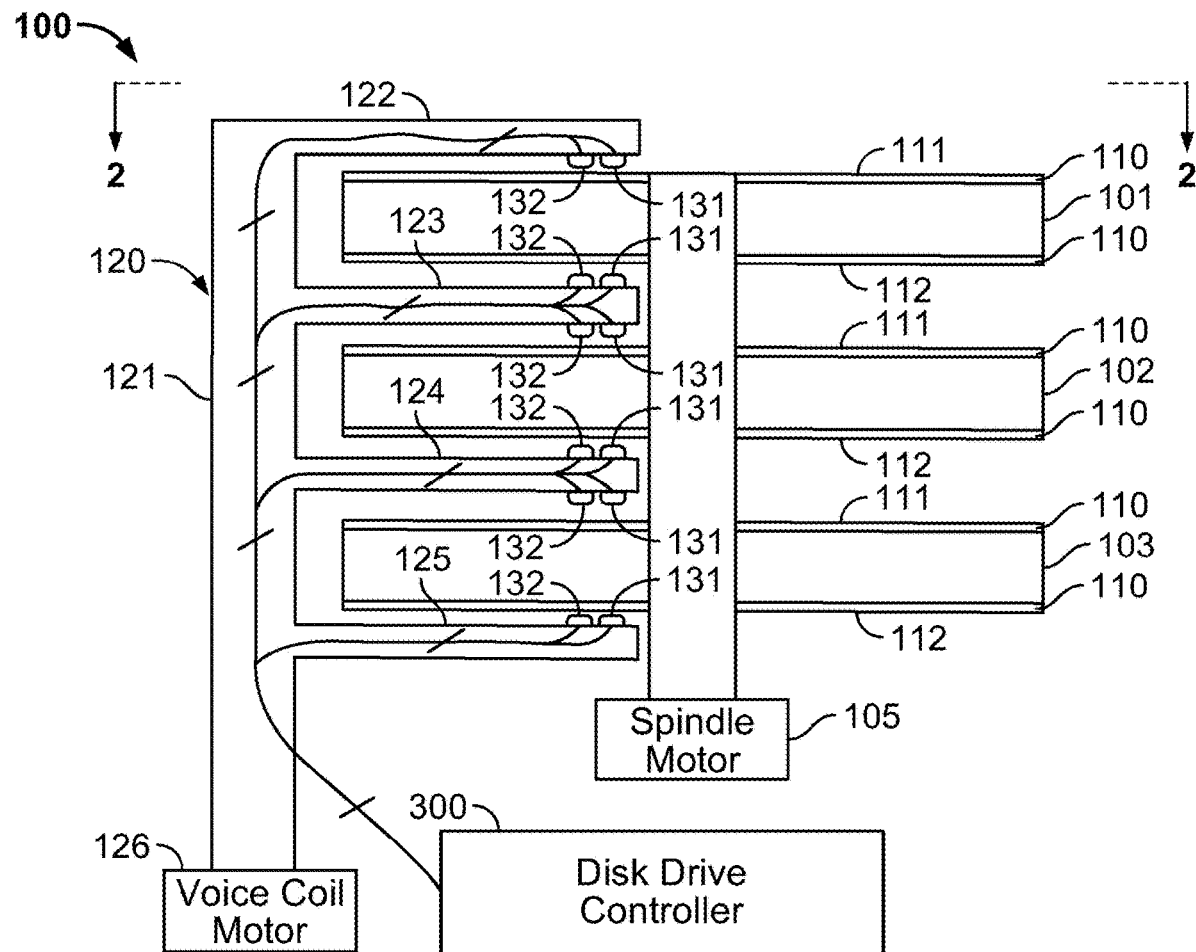
FIGS. 1 and 2 show an example of a disk drive 100 with which the subject matter of the present disclosure may be used.
Figure 2:
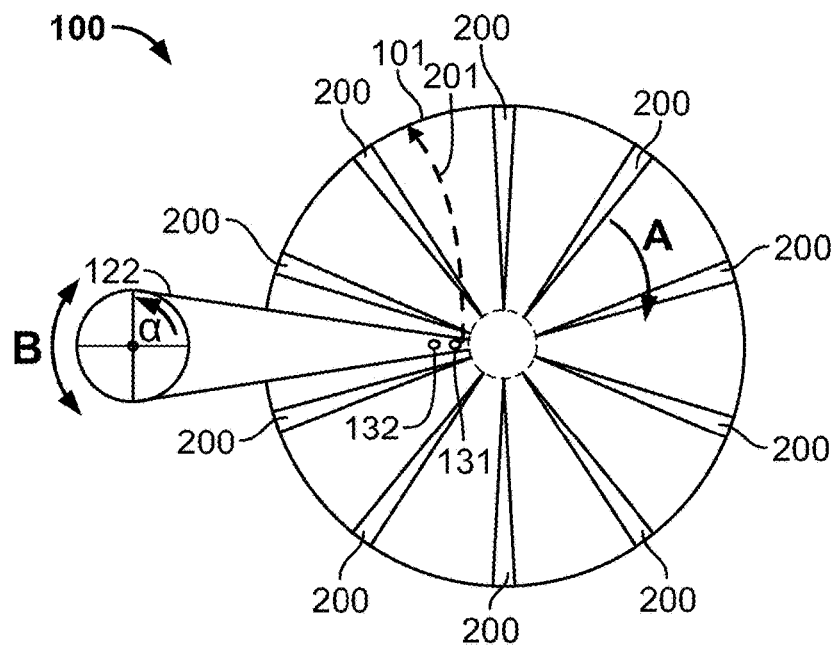

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

Figure 3:
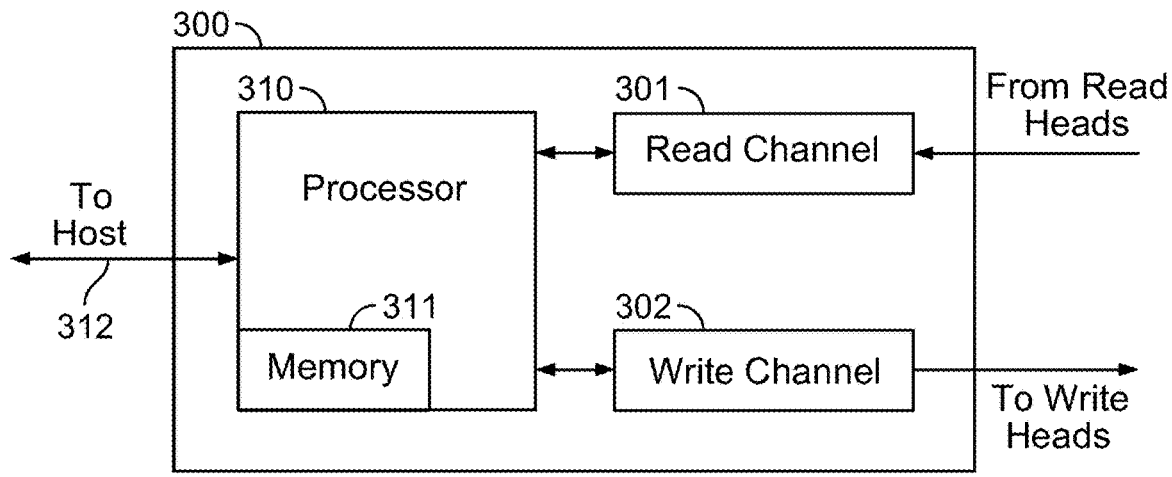
FIG. 3 is a diagram of a hard drive controller that may be used in a disk drive as in FIGS. 1 and 2 in implementations of the subject matter of this disclosure.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown).

As noted above, when writing user data to a hard disk drive, a preamble followed by user data is written first. When reading the data, a clock has to be recovered from the data that is read, and the preamble must be long enough for clock recovery to occur while the preamble is being read. However, the longer the preamble, the more disk space is occupied by preamble data, leaving less space for user data. Therefore, if clock or timing recovery is too slow, a longer preamble is required, reducing the disk space available for user data and lowering the storage efficiency of the disk drive. It would be desirable to shorten the preamble to increase the disk space available for user data.

When reading data from a hard disk drive, the signal from the disk drive read head originates as an analog signal, which is digitized for further processing. A clock has to be recovered from the data that is read, for among other things, clocking an analog-to-digital converter for digitizing the data. In typical analog timing recovery techniques, information is fed back from the digital domain to an analog clock source—e.g., a phase-locked loop (PLL)--that clocks the ADC. The feedback loop typically introduces substantial latency based on, e.g., the latency of zero-phase start circuitry, which adjusts the sampling phase, as well as the latency of timing accumulator circuitry. If the disk drive uses two heads, as in two-dimensional magnetic recording (TDMR) implementations, additional latency is introduced by any buffering needed to account for the distance between read heads.

However, a digital timing recovery technique may be provided which eliminates the effects of latency of zero-phase start operations and associated timing accumulation operations. In implementations of this technique, the analog timing is completely separated from the digital timing. The ADC in the analog domain, which digitizes the read-head signals, is clocked by a free-running clock (which may be provided, e.g., by a PLL). There is no feedback to that clock from the digital domain. However, in order to assure that the ADC conversion is not undersampled, the analog clock is deliberately oversampled so that is it certain to be no slower than the target clock to be recovered in the digital domain.

The digitized data from the read head or heads is buffered while zero-phase start operations are performed to determine a starting phase and magnitude which are fed forward (instead of being fed back as in analog timing recovery) to interpolation operations to recover the clock. If two or more heads are used, a delay or delays are used to align the respective signals from the different heads before buffering. However, zero-phase start operations will not function correctly on the oversampled signals. Therefore, in accordance with implementations of the subject matter of this disclosure, effects of the oversampling are removed by phase rotation, which may be thought of as equivalent to downsampling the signals back to their original sampling rate.

The zero-phase start operation begins with a DFT operation on the preamble data, to derive sine and cosine coefficients, which are accumulated to provide inputs to a CORDIC operation that determines the ZPS phase angle, which is converted into a sampling time adjustment. The preamble may be a 2T tone (11001100 . . . ), a 3T tone (111000111000 . . . ), or a 4T tone (1111000011110000 . . . ), requiring different CORDIC resolution. The number of CORDIC iterations may be selected for the highest required resolution. For example, ten iterations may provide the required resolution for the 4T case, without imposing a significant burden on the 2T or 3T case, even though fewer iterations may be sufficient in those cases. Once the ZPS angle has been determined, it may be converted to a ZPS time jump (i.e., sampling time adjustment) using, e.g., a single look-up table whose values may be multiplied by 2, 3 or 4, respectively, for a 2T, 3T or 4T preamble. A further correction may be implied taking into account the oversampling factor. Further adjustments or corrections may be applied by the user--in either the oversampled domain or the downsampled domain or both--to account for, e.g., constant errors due to media defects.

As noted above, phase rotation of the digitized oversampled signals may be performed prior to the zero-phase start operation to eliminate the effect of oversampling on the zero-phase start operation. In accordance with some implementations of the subject matter of this disclosure, the phase rotation may be performed by a two-tap finite-impulse-response (FIR) filter.

Coefficients of the phase rotation FIR filter may be calculated as described below, based on the ZPS length which determines the number of samples, and on the oversampling factor. In a disk drive, a separate set of phase rotation coefficients may be recomputed for each zone of each disk surface. Moreover, the coefficients change on each clock cycle for the then-current set of samples. There are multiple zones on every disk surface, two surfaces on every disk platter, and multiple platters in every drive, meaning that a large number of sets coefficients may be required.

The set of coefficients for the current zone of the current surface of the current platter may be read from a look-up table (e.g., under control of a read-channel processor). The coefficients may be computed in advance by software or firmware and loaded into the look-up table. However, given the large number of zones, the size of a look-up table needed to store all of the coefficients if precomputed could be prohibitive, except for the smallest drives. Once a drive reaches a certain size, it may be more efficient to use hardware circuitry to compute a new set of coefficients for a zone as the zone becomes active. This limits the size of the look-up table that would be needed to the size necessary to contain coefficients for the current zone and one upcoming zone. Moreover, the hardware computation may be faster than a software computation.

In an alternative simplified implementation, an approximation may be used for each set of coefficients, and appropriate biasing or correction factors may be applied during the zero-phase start operation to compensate for the approximation.

Implementations of the subject matter of this disclosure may be better understood by reference to FIGS. 4-16.

Figure 4:
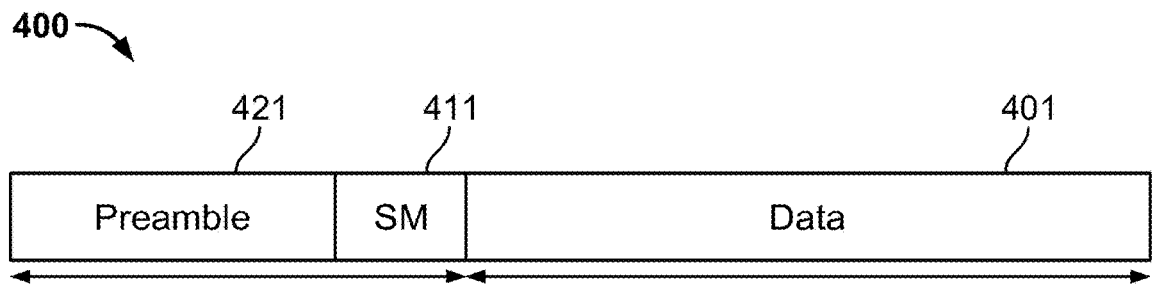
FIG. 4 is a is a representation of a data packet to be read from a hard disk drive.
Figure 5:
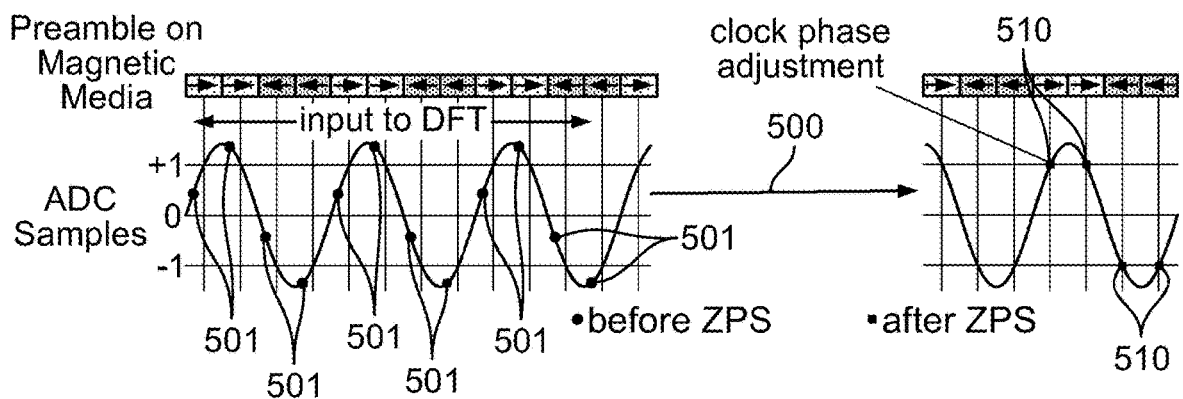
FIG. 5 is a graphical representation of the effect of a clock phase adjustment by zero-phase start (ZPS) on preamble data samples.

The nature of the problem to be solved may be appreciated from FIGS. 4 and 5. FIG. 4 is a representation of a data packet 400 to be read from a hard disk drive. In addition to the actual user data payload 401, data packet 400 includes a sync mark 411 to aid in locating packet 400, and a preamble 421 from which zero-phase start circuitry may determine the starting phase. As seen in FIG. 5, before the ZPS operation 500, ADC samples 501 occur at seemingly random times during the clock cycle. ZPS operation 500 runs the initial bits of the preamble through a DFT operation, to derive a phase adjustment after which ADC samples 510 are regularly distributed relative to the clock.

Figure 6:
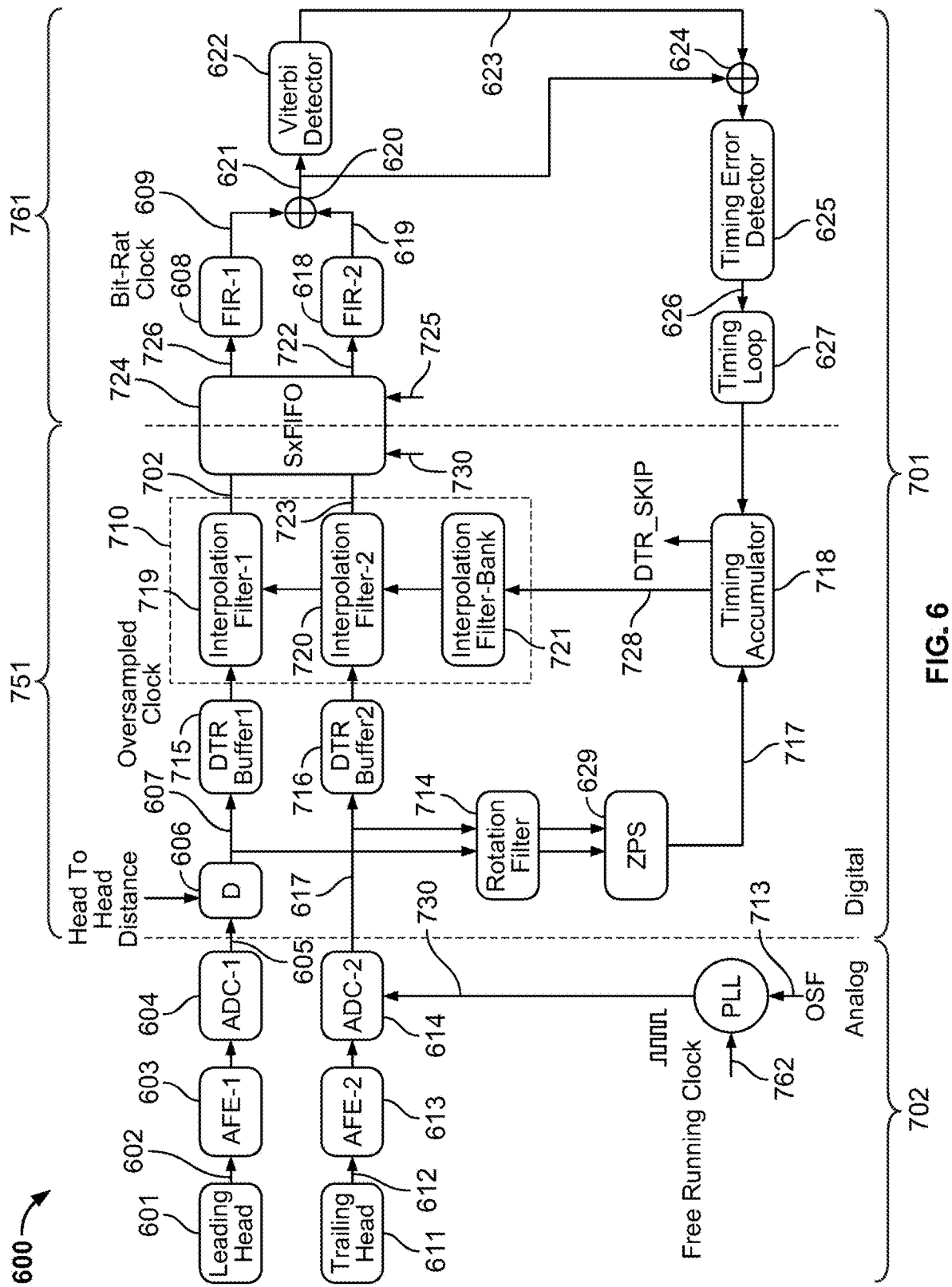
FIG. 6 is a schematic representation of a two-head read channel circuit configured for digital timing recovery in accordance with implementations of the subject matter of this disclosure.

In a two-head read channel circuit 600 configured for digital timing recovery, shown in FIG. 6, signal 602 from leading read head 601 is processed through analog front end AFE-1 (603) and then is digitized at analog-to-digital converter ADC-1 (604). Signal 612 from trailing read head 611 is processed through analog front end AFE-2 (613) and then is digitized at analog-to-digital converter ADC-2 (614). Digitized leading-head signal 605 is delayed at 606 so that digitized trailing-head signal 617 can catch up and the two signals 607, 617 are aligned.

Aligned delayed signals 607, 617 can be buffered as long as necessary in separate buffers—DTR Buffer-1 (715) and DTR Buffer-2 (716)—for the signals from leading read-head 601 and the signals from trailing read-head 611, respectively, until rotation operations in rotation filter 714, and ZPS operations in ZPS circuitry 629 can be completed and the ZPS output 717 can be processed through timing accumulator 718.

Instead of being fed back, the output of ZPS circuitry 629 is fed forward, to interpolation circuitry 710 that adjusts the clock phase as described below. There is no feedback from the digital clock domain 701 to the analog clock domain 702. Accordingly, to ensure that the analog sampling clock 730, which is not adjusted based on feedback, that clocks ADCs 604, 614 is not too slow, PLL 711, which has a free-running reference clock input 712, is overclocked by oversampling factor (OSF) 713. The digital clock domain 701 is thus divided into an oversampled clock subdomain 751 upstream of interpolation circuitry 710, and a bit-rate clock subdomain 761 downstream of interpolation circuitry 710.

Interpolation circuitry 710 may include separate interpolation filters—Interpolation Filter-1 (719) and Interpolation Filter-2 (720)—for the signals from leading read-head 601 and the signals from trailing read-head 611, respectively, as well as an interpolation bank 721 which may select from among predetermined sets of coefficients for interpolation filters 719, 720 based on ZPS output 717 as processed through timing accumulator 718.

Interpolated data signals 722, 723 from interpolation filters 719, 720 are clocked into first-in-first-out (FIFO) circuit 724 based on oversampled clock 730 but are clocked out of FIFO circuit 724 based on bit-rate clock 725. FIFO output signals 726, 727 are equalized in finite impulse response filters FIR-1 (608) and FIR-2 (618) and the equalized signals 609, 619 are combined at 620. The combined signal 621 passes through a Viterbi detector 622 to derive user data 401. The output 623 of Viterbi detector 622 is compared at 624 to signal 621 to yield a timing error signal 626 detected by timing error detector 625. Timing error signal 626 passes through timing loop 627 and is combined in timing accumulator 718 with the phase correction 717 determined by ZPS circuitry 629, providing selection signal 728 for interpolation bank 721 to select from among predetermined sets of coefficients for interpolation filters 719, 720 as discussed above.

Selection signal 728 may represent a phase shift of the oversampled signal relative to the desired phase, determined as follows:

if (PHASE SHIFT <0)
    NEXT PHASE SHIFT=PHASE SHIFT+1.0
  else
    NEXT PHASE SHIFT=PHASE SHIFT-(OSF+phase_error)
  if (NEXT PHASE SHIFT <0)
    SKIP CLOCK=1
  else
    SKIP CLOCK=0

That is, if the current phase shift (i.e., the phase of an interpolated sample relative to the desired phase) is negative, then the phase shift is increased by one clock period to make the phase shift positive. Otherwise, if the current phase shift is positive, the phase shift is decreased by the sum of the OSF and the measured phase error. And if the phase shift as so adjusted is still negative, then the phase skips forward one period.

Although digital timing recovery circuitry 600 is shown as accommodating two heads, digital timing recovery circuitry in accordance with implementations of this disclosure may work with only one head, or with three (or more) heads.

In a one-head implementation, one of DTR Buffer-1 (715) and DTR Buffer-2 (716) and one of Interpolation Filter-1 (719) and Interpolation Filter-2 (720) may be omitted, or forced to zero, and rotation filter 714 and ZPS circuitry 629 may operate with a single input. Additional circuitry may be provided if there are additional heads.

As noted above, implementations of this disclosure are intended to minimize the length of the preamble to maximize the amount of space available for user data. Accordingly, using techniques in accordance with implementations of this disclosure may not speed up performance of the various calculations required (phase rotation, zero-phase start, etc.). Rather, because the digital data from the read head or heads may be held in the DTR buffer or buffers as long as is necessary for those calculations to be performed (which in some cases may actually increase the overall time required), the size of the preamble, and therefore the storage space for the preamble, is determined simply by the length of the Discrete Fourier Transform of the preamble tone, which may be a 2T tone, a 3T tone or a 4T tone.

ZPS circuitry 629 will not operate correctly on an oversampled clock. Therefore, digital timing recovery circuitry 600 includes a rotation filter 714, upstream of ZPS circuitry 629, to filter out the effect of OSF 713.

Figure 7:
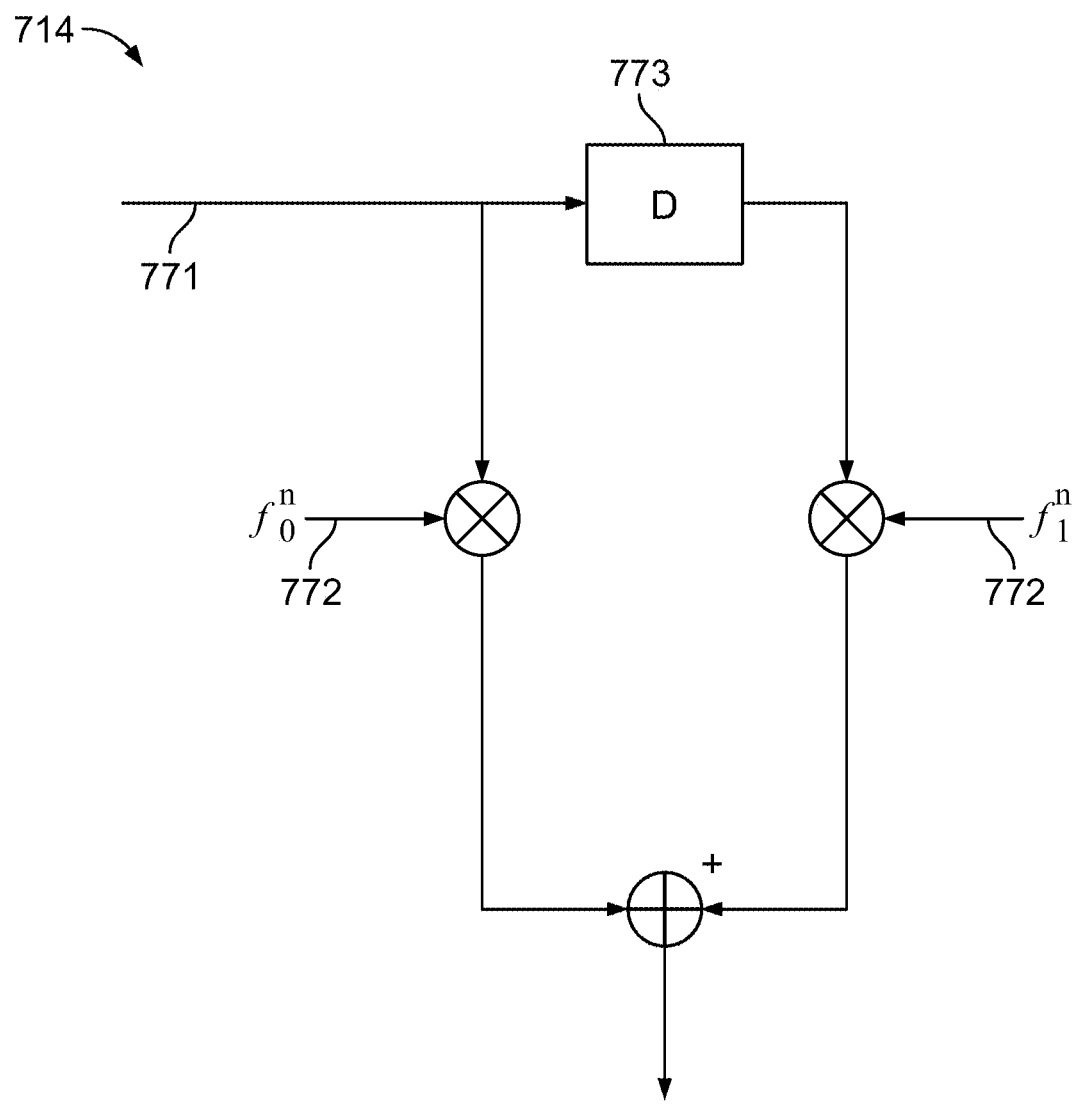
FIG. 7 is a schematic representation of a rotation filter in accordance with implementations of the subject matter of this disclosure.

Rotation filter 714 may be a two-tap FIR filter as shown in FIG. 7. An input sample 771 is multiplied by coefficients $f_0{}^n$ at tap 772, and, after a delay 773, by coefficients $f_1{}^n$ at tap 774. In accordance with implementations of the subject matter of this disclosure, the coefficients $f_0{}^n$, $f_1{}^n$ may implement a minimum mean square error (MMSE) rotation filter as follows:

$$f_0^n = \frac{\cos\left(\frac{n\pi x}{p}\right) - \cos\left(\frac{\pi[(n-2)x+2]}{p}\right)}{1 - \cos\left(\frac{2\pi(x-1)}{p}\right)} = \cos\left(\frac{n\pi x}{p}\right) + \frac{\cos\left(\frac{\pi(1-x)}{p}\right)}{\sin\left(\frac{\pi(1-x)}{p}\right)} \cdot \sin\left(\frac{n\pi x}{p}\right)$$

and $$f_1^n = \frac{\cos\left(\frac{\pi[(n-1)x+1]}{p}\right) - \cos\left(\frac{\pi[(n+1)x-1]}{p}\right)}{1 - \cos\left(\frac{2\pi(x-1)}{p}\right)} = -\frac{1}{\sin\left(\frac{\pi(1-x)}{p}\right)} \cdot \sin\left(\frac{n\pi x}{p}\right)$$

where:

$$\cos\left(\frac{\pi n x}{p}\right)$$

is the desired output,
x is the oversampling factor,
n=0, 1, 2, ..., N−1 for the (n+1)th sample of an N-sample ZPS operation, and
p=2, 3, 4 depending on whether signal has 2T preamble, a 3T preamble or a 4T preamble.

Figure 8:
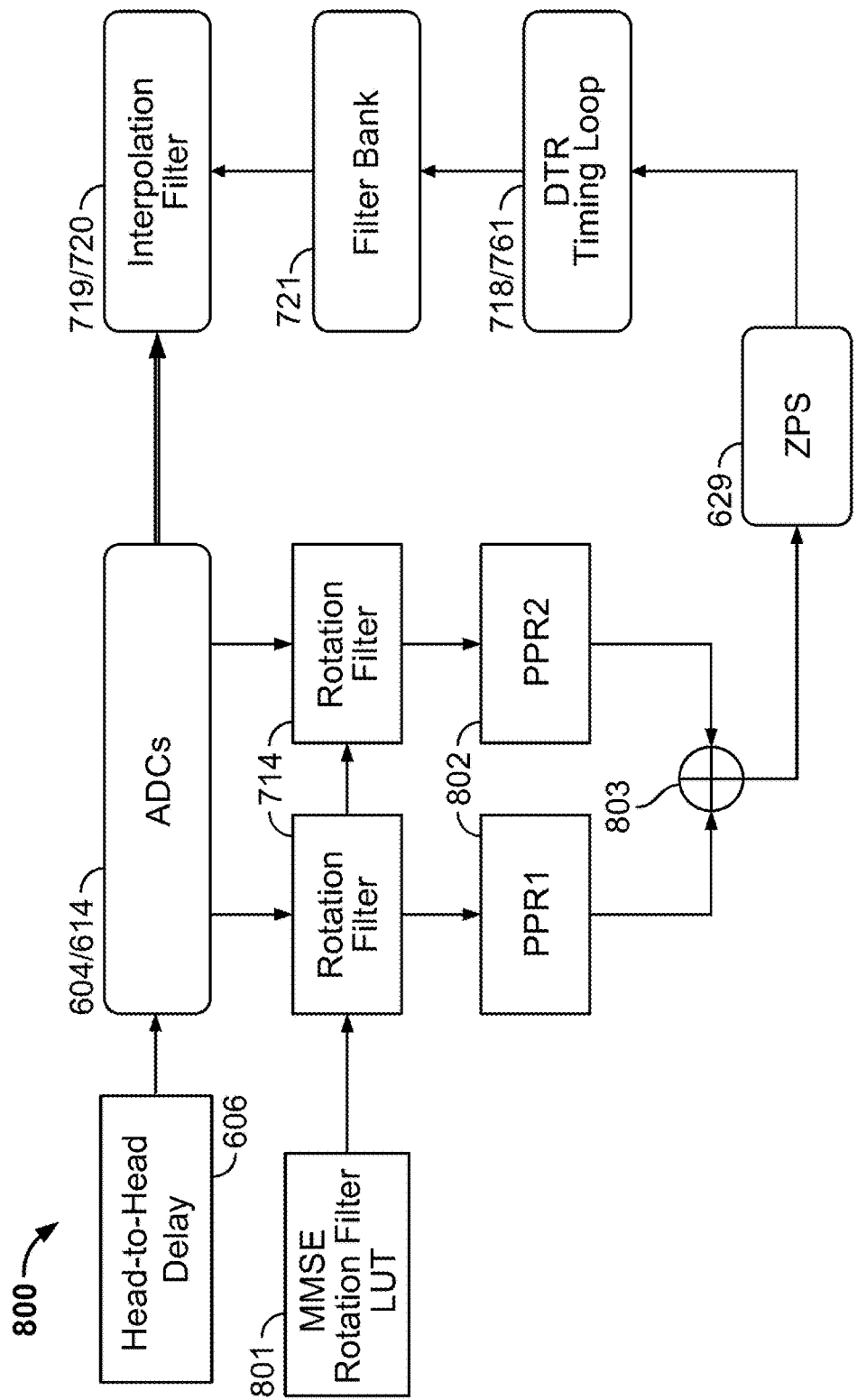
FIG. 8 is a simplified schematic representation of a two-head read channel circuit configured for digital timing recovery in accordance with implementations of the subject matter of this disclosure.

As seen in FIG. 8, which is a simplified version 800 of FIG. 6, the rotation filter coefficients may be loaded into a look-up table (LUT) 801, and the rotation filters 714 provide phase-rotated signals 802 which are combined at 803 for input to ZPS circuitry 629. In the case, e.g., of a disk drive, the appropriate set of rotation filter coefficients is loaded (e.g., under control of read-channel processor 310) for the zone being read, and cycle through the N rotation filter coefficients (n=0, ..., N−1).

The rotation filter coefficients may be precomputed when the system (e.g., a disk drive) is set up, and loaded into LUT 801. However, for a large system, such as a disk drive with multiple two-sided platters, a look-up table large enough to store all rotation filter coefficients for all zones may be impractical and it may take too long to precompute so many rotation filter coefficients. Therefore, in accordance with implementations of the subject matter of this disclosure, the rotation filter coefficients may be determined by circuitry configured for that purpose, as described below. In some implementations, that circuitry will operate to determine a set of rotation filter coefficients for the current zone and will load a look-up table with those currently-determined rotation filter coefficients.

Figure 9:
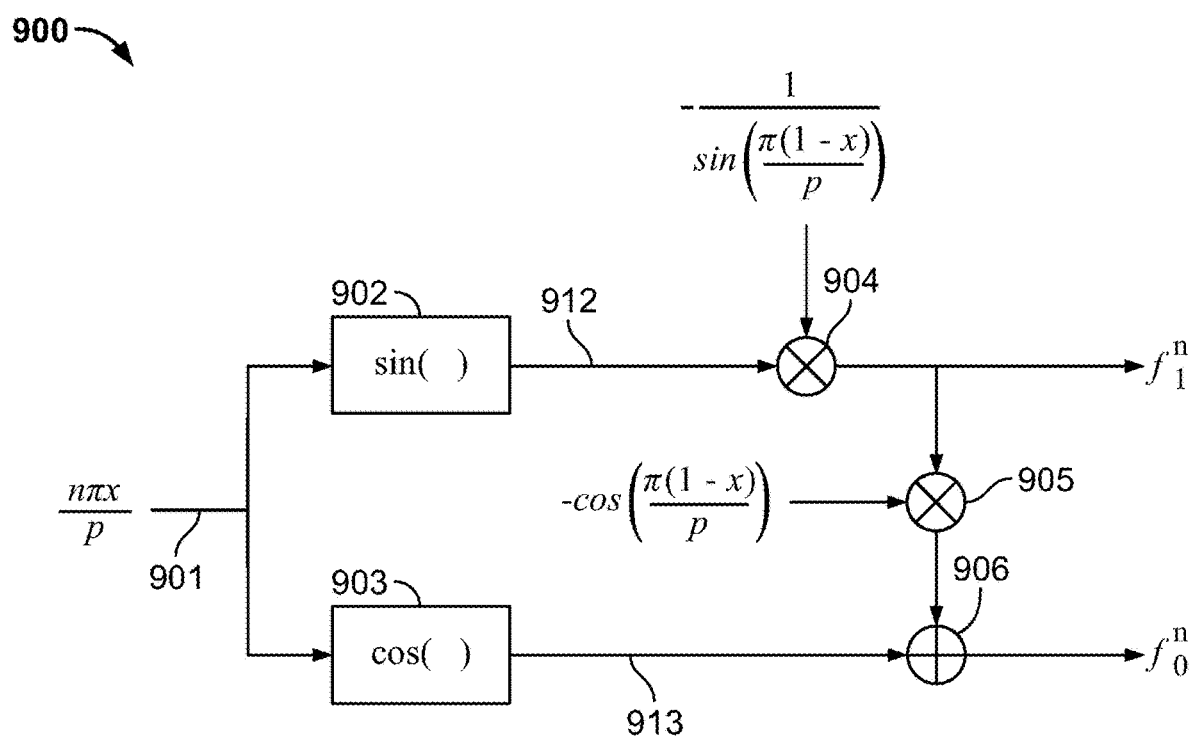
FIG. 9 is a simplified schematic representation of circuitry for determining rotation filter coefficients in accordance with implementations of the subject matter of this disclosure.

FIG. 9 shows one simplified implementation of circuitry 900 for determining the rotation filter coefficients. Sine computation circuitry 902 may be hard-wired to determine the sine 912 of input 901 and the cosine computation circuitry 903 may be hard-wired to determine the cosine 913 of input 901. Multiplier circuitry 904 may be hard-wired to determine the product of sine 912 and $$-\frac{1}{\sin\left(\frac{\pi(1-x)}{p}\right)}$$

to yield $f_1{}^n$. Similarly, multiplier circuitry 905 may be hard-wired to determine the product of $$-\cos\left(\frac{\pi(1-x)}{p}\right)$$

and the output of multiplier circuitry 904, and adder 906 may be hard-wired to determine the sum of the output of multiplier circuitry 905 and the output 913 of cosine computation circuitry 903 to yield $f_0{}^n$. The $f_0{}^n$ coefficients are thus a function of the $f_1{}^n$ coefficients.

Figure 10:
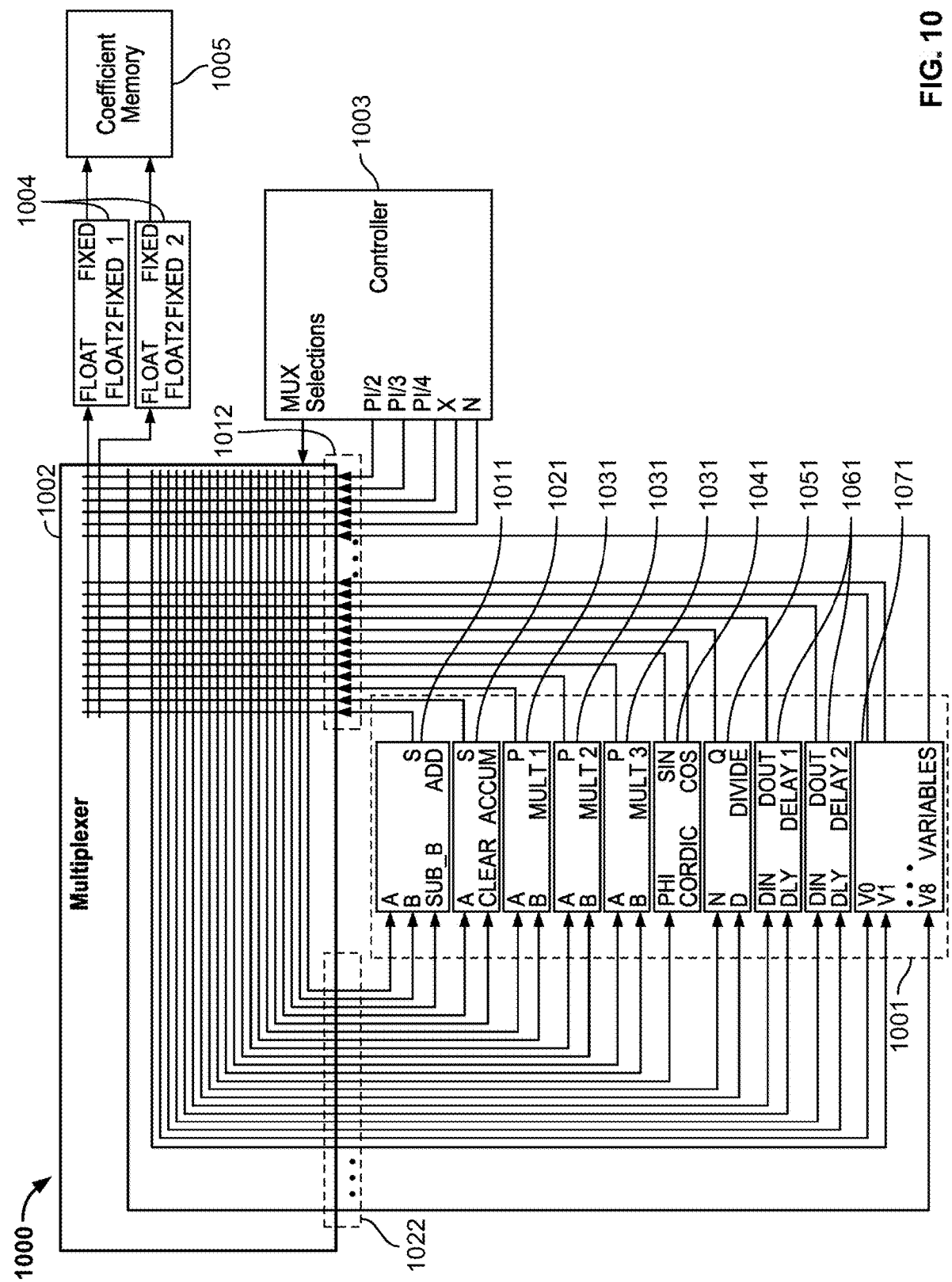
FIG. 10 is a schematic representation of a specific implementations of circuitry for determining rotation filter coefficients in accordance with the subject matter of this disclosure.

One specific implementation 1000 of circuitry 900 for determining the rotation filter coefficients is shown in FIG. 10. Because circuitry 1000 has to perform multiple calculations (see FIG. 9) for each nth iteration of the N samples of each ZPS operation, circuitry 1000 is configured for multiple pipelined computations. A plurality of separate circuits 1001 are provided, each of which is configured to perform a particular mathematical operation. Operations from different stages of the pipelined computations may be performed simultaneously.

In the implementation shown, circuits 1001 include one adder circuit 1011, one accumulator circuit 1021, three multiplier circuits 1031, one CORDIC (Coordinate Rotation DIgital Computer) circuit 1041 for performing sine and cosine operations, one divider circuit 1051, and two delay circuits or lines 1061, as well as "variables" circuit 1071 that is configured to compute certain combinations of inputs that are used repeatedly, such as, e.g., $$\frac{n\pi x}{p}.$$

A multi-input/multi-output multiplexer 1002 is a fully populated crossbar switch configured to make any connection between any of its inputs 1012 and any of its outputs 1022, to enable any of the various circuits 1001 to accept as inputs the outputs of others of the various circuits 1001, combined in the correct order or sequence, under control of controller circuit 1003, which also supplies certain constants, including n, x, π/2, π/3, and π/4 to ones of inputs 1012, to complete the required operations. Controller circuit 1003 may be implemented as a state machine configured with the foregoing expressions for $f_0^n$ and $f_1^n$.

Alternatively, instead of using CORDIC circuit 1041 to compute sine and cosine values, one can use an alternate circuit (not shown) configured to perform a Taylor series to find sine values:

$$\sin(t) = \sum_{i=0}^{\infty} \frac{(-1)^i}{(2i+1)!} t^{(2i+1)} \approx t - \frac{t^3}{3!} + \frac{t^5}{5!} - \frac{t^7}{7!} + \frac{t^9}{9!}$$

and then to use the known relationship between sine and cosine:

$$\cos(t) = \sin\left(t + \frac{\pi}{2}\right)$$

to find cosine values. Alternatively, one can use the separate Taylor series for cosine values:

$$\cos(t) = \sum_{i=0}^{\infty} \frac{(-1)^i}{(2i)!} t^{(2i)} \approx t - \frac{t^2}{2!} + \frac{t^4}{4!} - \frac{t^6}{6!} + \frac{t^8}{8!}$$

Because the various intermediate computations performed by circuitry 1000 may have different numbers of decimal places and different orders of magnitude, the various circuits 1001 may be implemented for floating-point operations. However, digital timing recovery circuitry 600 may be implemented for fixed-point operations. Therefore, circuitry 1000 may include floating-point-to-fixed-point converters 1004, to convert the floating-point outputs to fixed-point representations for storage in the coefficient memory 1005, which may serve as look-up table 801.

In some implementations, particularly for small oversampling factors x, the expressions for $f_0^n$ and $f_1^n$ may be simplified, so that they are independent of each other. For example, for a 2T preamble (i.e., p=2) and x=0.05, $$\frac{\cos\left(\frac{\pi(1-x)}{p}\right)}{\sin\left(\frac{\pi(1-x)}{p}\right)} = 0.0787,$$

which is close to zero, although it is somewhat larger for p=3 (0.6494) or p=4 (1.08179), and even larger for larger oversampling factors x. Nevertheless, if one assumes that $$\frac{\cos\left(\frac{\pi(1-x)}{p}\right)}{\sin\left(\frac{\pi(1-x)}{p}\right)} = 0,$$

then one can approximate $$f_0^n \text{ as } \cos\left(\frac{n\pi x}{p}\right),$$

which may be sufficient, particularly for small oversampling factors x.

Similarly, for a 2T preamble (i.e., p=2) and x=0.05, $$\frac{1}{\sin\left(\frac{\pi(1-x)}{p}\right)} = 1.003,$$

which is close to 1, although it is somewhat larger for p=3 (1.19236) or p=4 (1.473186), and even larger for larger oversampling factors x. Nevertheless, if one assumes that $$\frac{1}{\sin\left(\frac{\pi(1-x)}{p}\right)} = 1,$$

then one can approximate $f_1^n$ as $$-\sin\left(\frac{n\pi x}{p}\right),$$

which may be sufficient, particularly for small oversampling factors x.

Figure 11:
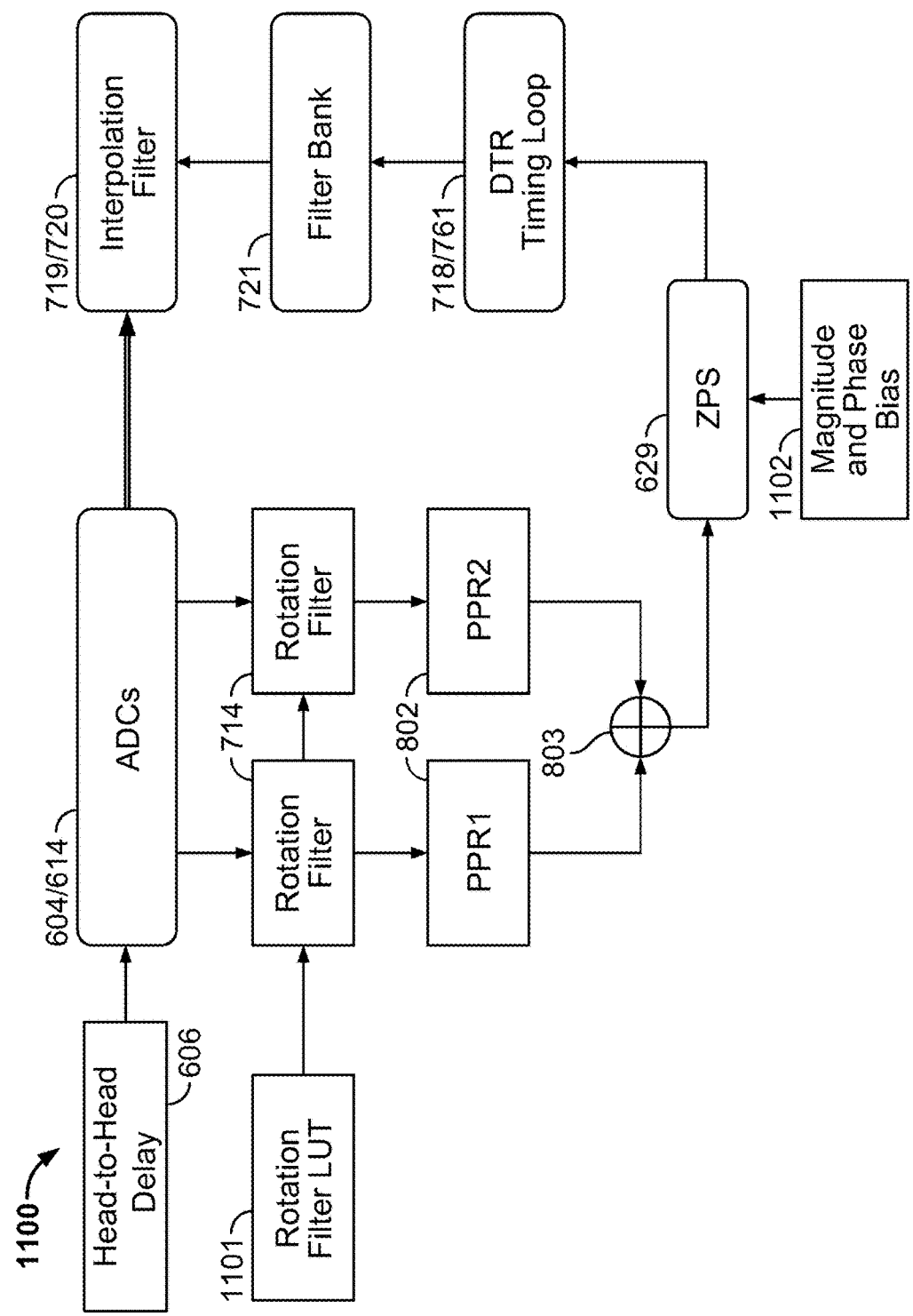
FIG. 11 is a simplified schematic representation, similar to FIG. 8, of a two-head read channel circuit configured for digital timing recovery in accordance with other implementations of the subject matter of this disclosure.

Accordingly, for implementations where the simplifications that $$f_0^n = \cos\left(\frac{n\pi x}{p}\right) \text{ and } f_1^n = -\sin\left(\frac{n\pi x}{p}\right)$$

are sufficient, simplified digital timing recovery circuitry 1100, seen in FIG. 11, may be provided. Digital timing recovery circuitry 1100 is similar to digital timing recovery circuitry 800, except that MMSE rotation filter LUT 801, which stores the unsimplified rotation filter coefficients, is replaced by rotation filter LUT 1101, which stores the simplified rotation filter coefficients, and a magnitude and phase bias circuit 1102 is added as an input to ZPS circuitry 629, to compensate for inaccuracies introduced by the use of the simplified coefficients.

Figure 12:
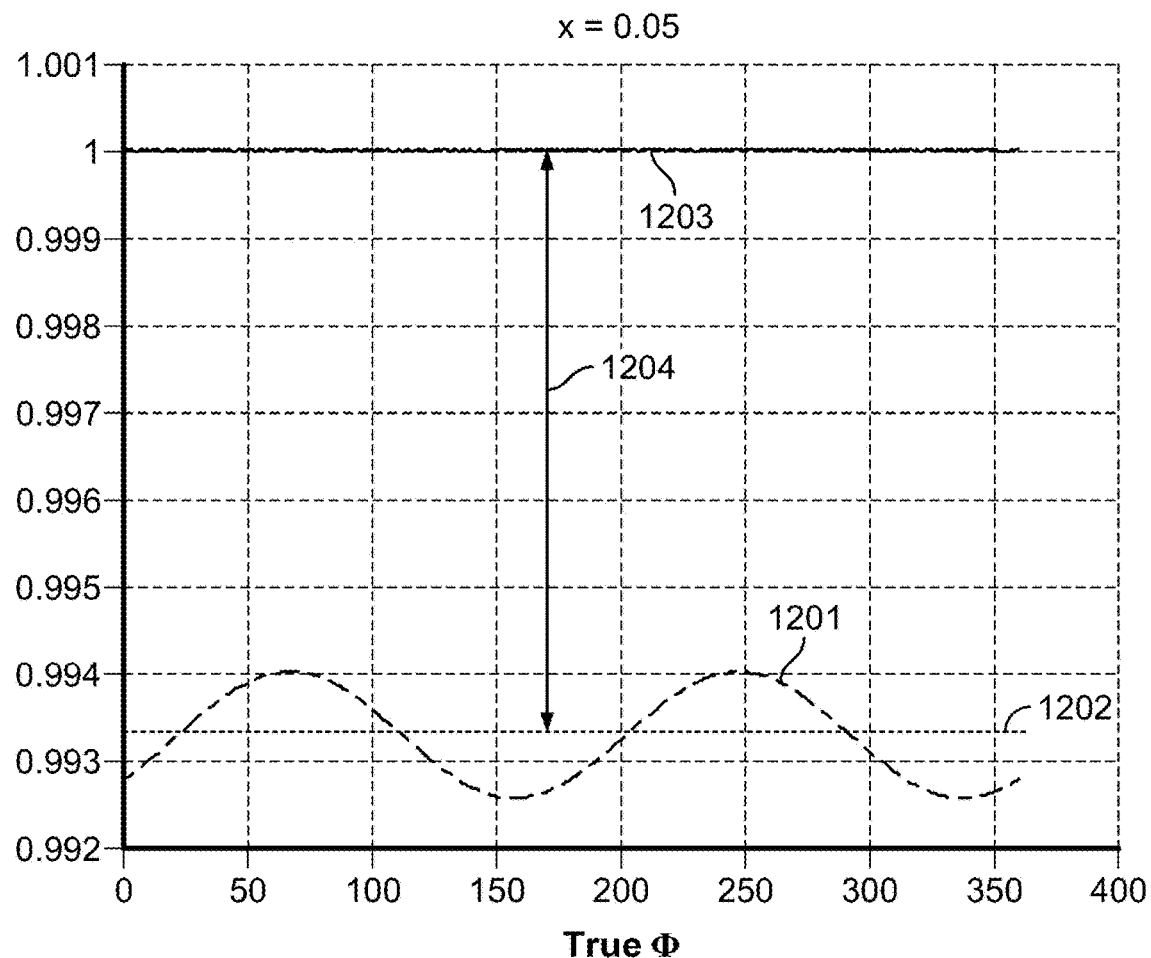
FIG. 12 is a graphical representation of magnitude bias in the output of implementations of this disclosure in accordance with FIG. 11.
Figure 13:
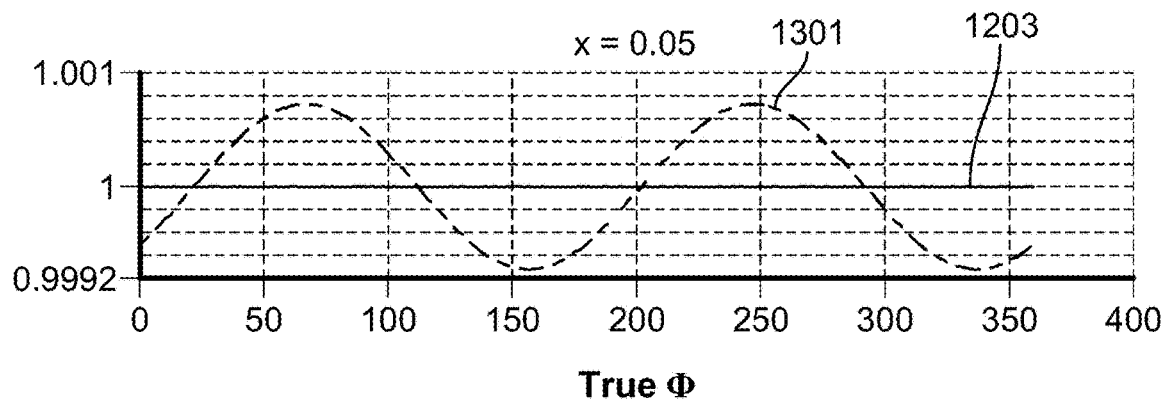
FIG. 13 is a schematic representation showing compensation for the magnitude bias shown in FIG. 12.
Figure 14:
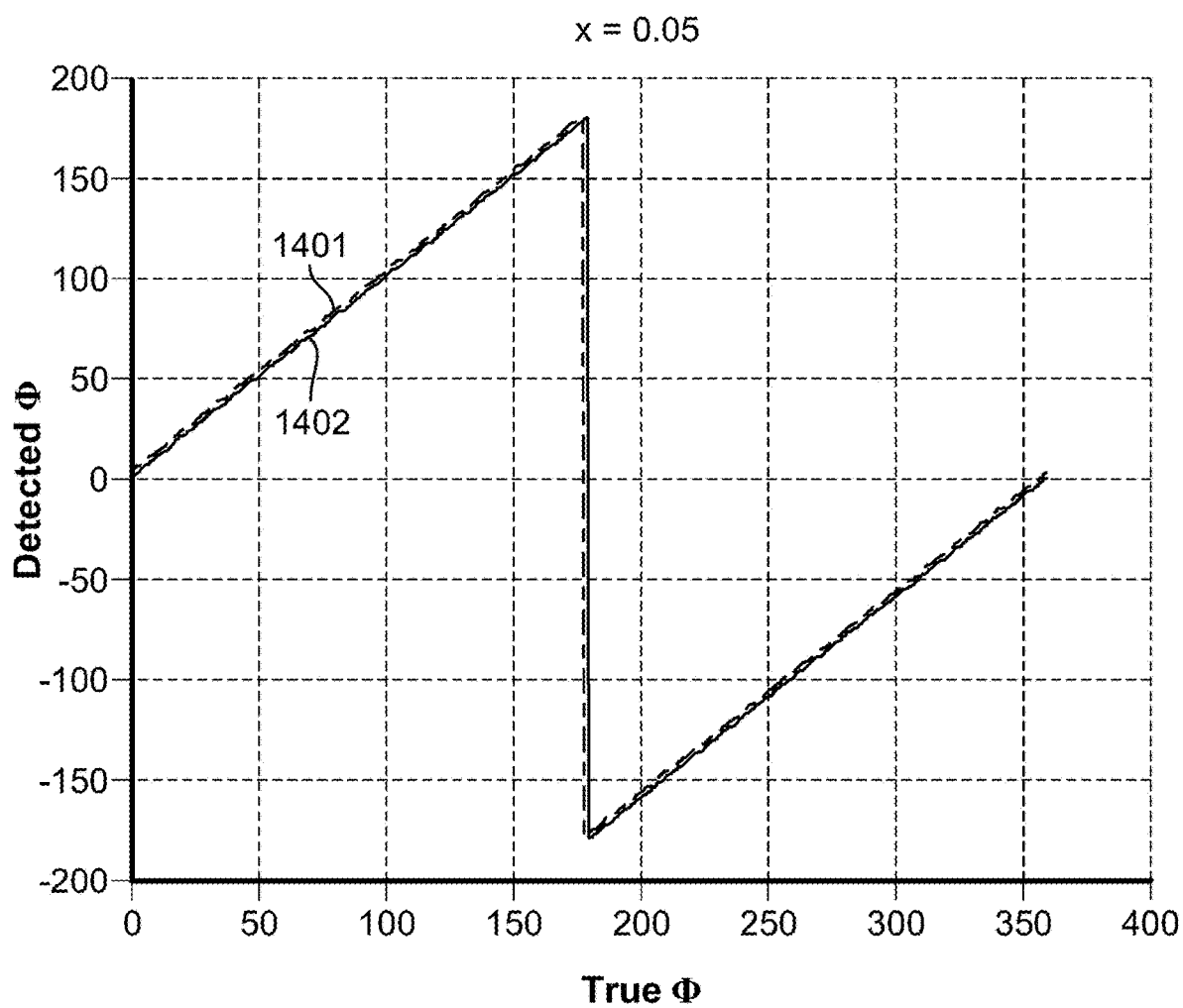
FIG. 14 is a graphical representation of phase bias in the output of implementations of this disclosure in accordance with FIG. 11.
Figure 15:
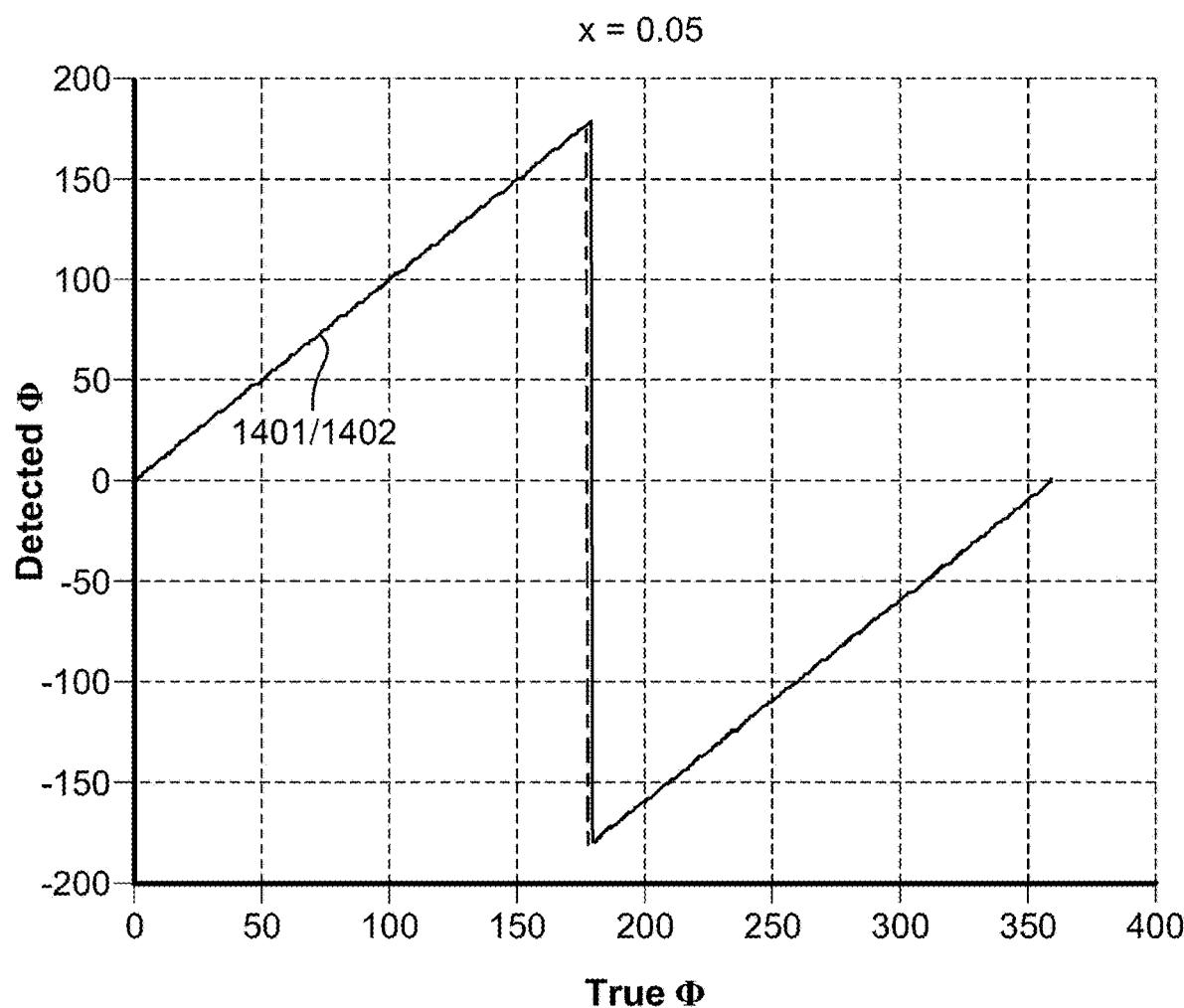
FIG. 15 is a schematic representation showing compensation for the phase bias shown in FIG. 15.

Specifically, FIG. 12 shows how the detected magnitude 1201 varies about an average value 1202 below the actual magnitude 1203. By using bias circuit 1102 to add a bias value 1204, the resulting compensated detected magnitude 1301 varies closely about the actual magnitude 1203, as seen in FIG. 13. Similarly, as seen in FIG. 14, the detected phase 1401 is slightly to the left of the actual phase 1402 as seen in FIG. 14, but using bias circuit 1102 to add a phase bias to detected phase 1401 can shift the detected phase bias to more closely overlap the actual phase 1402 as seen in FIG. 15.

Figure 16:
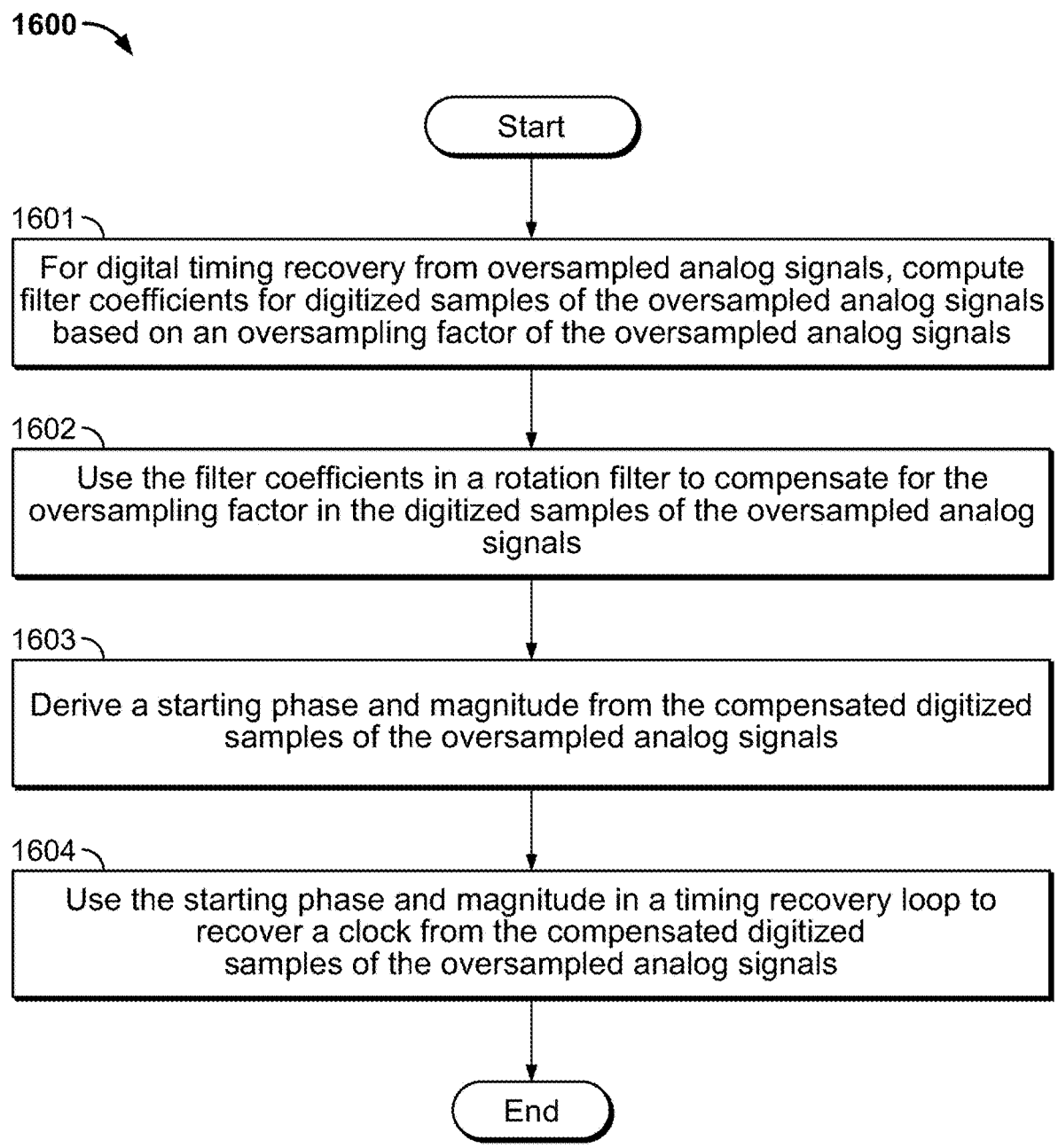
FIG. 16 is a flow diagram illustrating a method in accordance with implementations of the subject matter of this disclosure.

A method 1600 according to implementations of the subject matter of this disclosure is diagrammed in FIG. 16. Method 1600 begins at 1601, where, for digital timing recovery from oversampled analog signals, filter coefficients for digitized samples of the oversampled analog signals are computed based on an oversampling factor of the oversampled analog signals. At 1602, the filter coefficients are used in a rotation filter to compensate for the oversampling factor in the digitized samples of the oversampled analog signals. At 1603, a starting phase and magnitude are derived from the compensated digitized samples of the oversampled analog signals. At 1604, the starting phase and magnitude are used in a timing recovery loop to recover a clock from the compensated digitized samples of the oversampled analog signals. Method 1600 then ends.

Thus it is seen that a rotation filter to compensate, in digital timing recovery, for oversampling of analog signals, and techniques and circuitry for determining coefficients for such a filter, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for digital timing recovery from oversampled analog signals, the method comprising:
   computing filter coefficients for digitized samples of the oversampled analog signals based on an oversampling factor of the oversampled analog signals;
   using the filter coefficients in a rotation filter to compensate for the oversampling factor in the digitized samples of the oversampled analog signals;
   deriving a starting phase and magnitude from the compensated digitized samples of the oversampled analog signals; and
   using the starting phase and magnitude in a timing recovery loop to recover a clock from the compensated digitized samples of the oversampled analog signals.

2. The method for digital timing recovery from oversampled analog signals according to claim 1 wherein:
   the computing comprises computing respective sets of approximate coefficients for respective taps of the rotation filter, each set of approximate coefficients being independent of another set of approximate coefficients; the method further comprising:
   applying a bias to the clock recovered from the compensated digitized samples of the oversampled analog signals, to account for the approximate coefficients.

3. The method for digital timing recovery from oversampled analog signals according to claim 1 wherein:
   the computing comprises computing respective sets of coefficients for respective taps of the rotation filter, each set of coefficients being dependent on another set of coefficients.

4. The method for digital timing recovery from oversampled analog signals according to claim 1 wherein, when the oversampled analog signals are from zones of a storage medium, the computing comprises computing respective separate sets of the filter coefficients corresponding to each respective zone.

5. The method for digital timing recovery from oversampled analog signals according to claim 4, the method further comprising:
   storing the respective sets of the filter coefficients; and
   retrieving the respective sets of the filter coefficients according to the respective zone.

6. The method for digital timing recovery from oversampled analog signals according to claim 1 wherein the computing comprises:
   performing a plurality of partial calculations; and
   combining selected ones of the plurality of partial calculations in sequence.

7. The method for digital timing recovery from oversampled analog signals according to claim 6 wherein the combining comprises multiplexing outputs of some of the selected ones of the plurality of partial calculations to provide inputs to others of the selected ones of the plurality of partial calculations.

8. Digital timing recovery circuitry configured to recover a clock from oversampled analog signals, the digital timing recovery circuitry comprising:
   circuitry configured to compute filter coefficients for digitized samples of the oversampled analog signals based on an oversampling factor of the oversampled analog signals;
   a rotation filter configured to use the filter coefficients to compensate for the oversampling factor in the digitized samples of the oversampled analog signals;
   zero phase start circuitry configured to derive a starting phase and magnitude from the compensated digitized samples of the oversampled analog signals; and
   a timing recovery loop configured to recover the clock from the compensated digitized samples of the oversampled analog signals.

9. The digital timing recovery circuitry of claim 8 wherein:
   the rotation filter comprises a plurality of taps; and
   the circuitry configured to compute the filter coefficients is configured to compute a respective set of approximate coefficients for each respective tap of the rotation filter, each set of approximate coefficients being independent of another set of approximate coefficients.

10. The digital timing recovery circuitry of claim 9 wherein the rotation filter comprises two taps.

11. The digital timing recovery circuitry of claim 9, further comprising:
    bias circuitry configured to apply a bias to the clock recovered from the compensated digitized samples of the oversampled analog signals, to account for the approximate coefficients.

12. The digital timing recovery circuitry of claim 8 wherein:
    the rotation filter comprises a plurality of taps; and
    the circuitry configured to compute the filter coefficients is configured to compute respective sets of coefficients for respective taps of the rotation filter, each set of coefficients being dependent on another set of coefficients.

13. The digital timing recovery circuitry of claim 8 wherein, when the oversampled analog signals are from zones of a storage medium, the circuitry configured to compute the filter coefficients is configured to compute respective separate sets of the filter coefficients corresponding to each respective zone.

14. The digital timing recovery circuitry of claim 13, further comprising:
    memory configured to store the respective sets of the filter coefficients; and
    a processor configured to retrieve the respective sets of the filter coefficients according to the respective zone.

15. The digital timing recovery circuitry of claim 8 wherein the circuitry configured to compute the filter coefficients comprises:
    a plurality of computation circuits, each respective computation circuit in the plurality of computation circuits being configured to perform a respective partial calculation; and circuitry for combining selected ones of the respective partial calculations in sequence.

16. The digital timing recovery circuitry of claim 15 wherein the circuitry for combining comprises a multiplexer configured to select outputs of some of the selected ones of the plurality of computation circuits as inputs to others of the selected ones of the plurality of computation circuits.

17. Digital timing recovery circuitry configured to recover a clock from oversampled analog signals, the digital timing recovery circuitry comprising:
   means configured to compute filter coefficients for digitized samples of the oversampled analog signals based on an oversampling factor of the oversampled analog signals;
   rotation filter means configured to use the filter coefficients to compensate for the oversampling factor in the digitized samples of the oversampled analog signals;
   zero phase start means configured to derive a starting phase and magnitude from the compensated digitized samples of the oversampled analog signals; and
   timing recovery means configured to recover the clock from the compensated digitized samples of the oversampled analog signals.

18. The digital timing recovery circuitry of claim 17 wherein:
   the rotation filter means comprises a plurality of taps; and
   the means configured to compute the filter coefficients is configured to compute a respective set of approximate coefficients for each respective tap of the rotation filter means, each set of approximate coefficients being independent of another set of approximate coefficients.

19. The digital timing recovery circuitry of claim 18 wherein the rotation filter means comprises two taps.

20. The digital timing recovery circuitry of claim 18, further comprising:
   biasing means configured to apply a bias to the clock recovered from the compensated digitized samples of the oversampled analog signals, to account for the approximate coefficients.

21. The digital timing recovery circuitry of claim 17 wherein:
   the rotation filter means comprises a plurality of taps; and
   the means configured to compute the filter coefficients is configured to compute respective sets of coefficients for respective taps of the rotation filter means, each set of coefficients being dependent on another set of coefficients.

22. The digital timing recovery circuitry of claim 17 wherein, when the oversampled analog signals are from zones of a storage means, the means configured to compute the filter coefficients is configured to compute respective separate sets of the filter coefficients corresponding to each respective zone.

23. The digital timing recovery circuitry of claim 22, further comprising:
   memory means configured to store the respective sets of the filter coefficients; and
   processor means configured to retrieve the respective sets of the filter coefficients according to the respective zone.

24. The digital timing recovery circuitry of claim 17 wherein the means configured to compute the filter coefficients comprises:
   a plurality of computation means, each respective computation means in the plurality of computation means being configured to perform a respective partial calculation; and
   means for combining selected ones of the respective partial calculations in sequence.

25. The digital timing recovery circuitry of claim 24 wherein the means for combining comprises multiplexing means configured to select outputs of some of the selected ones of the plurality of computation means as inputs to others of the selected ones of the plurality of computation means.

\* \* \* \* \*